United States Patent
Nishikawa

Patent Number: 4,601,548
Date of Patent: Jul. 22, 1986

[54] MICROLENS

[75] Inventor: Mitsuru Nishikawa, Osaka, Japan

[73] Assignee: Sumitomo Electric Industries, Ltd., Japan

[21] Appl. No.: 546,517

[22] Filed: Oct. 28, 1983

[30] Foreign Application Priority Data

Nov. 6, 1982 [JP] Japan ................ 57-168259
Jun. 28, 1983 [JP] Japan ................ 58-100415

[51] Int. Cl.⁴ .................................................. G02B 3/00
[52] U.S. Cl. .................................. 350/416; 350/96.26
[58] Field of Search .................... 350/96.26, 416

[56] References Cited

U.S. PATENT DOCUMENTS 3,656,832  4/1972  Judin ................... 350/416
4,354,734  10/1982  Nakahashi ............... 350/96.26

Primary Examiner—John K. Corbin
Assistant Examiner—P. M. Dzierzynski
Attorney, Agent, or Firm—Ernest A. Beutler

[57] ABSTRACT

A microlens for use with an optical fiber or the like. It comprises a single lens having a diameter of about 0.5 mm. It provides an ideal combination of the length of the lens with the refractive index of its opposite surfaces for a minimum curvature of field.

2 Claims, 1 Drawing Figure

MICROLENS

The present invention relates to a microlens having a diameter of about 0.5 mm for use with optical and image fibers, and adapted for image formation with a minimum curvature of field.

As optical fibers come into general use in recent years, there is an increasing demand for microlenses which are used as coupling lenses for optical fibers or as image pickup lenses for image fibers. Especially in the medical field where the miniaturization of endoscopes is desired, intravascular endoscopes and cardioscopes require lenses having a diameter of about 0.5 mm. An endoscope transmits a picture through an image fiber and its image pickup portion accommodates a lens or lenses for making the image of an object at the end surface of an image fiber. Although it is generally prevalent to combine a plurality of lenses in order to minimize the aberration, combining a plurality of such tiny lenses poses a difficult problem because it is very difficult to mount them in the image pickup portion in exact alignment with each other and to fix them in position. Therefore, the use of a single microlens is more feasible than combining a plurality of microlenses. If the angle of field is large, however, the use of a single microlens causes a large curvature of field which is one of the aberrations and the picture quality in the peripheral region of an image remarkably deteriorates. The large angle of field requires a short focal distance which in turn, requires a large angle of refraction. With a single lens, a light ray undergoes refraction only twice i.e. when entering it and when leaving it. This means that the angle of refraction per refraction surface is large. On the other hand, generally, the larger the angle of refraction, the larger the aberration.

It is an object of the present invention to provide a microlens which is comprised of a single lens having a very small diameter and can form an image with a minimum curvature of field.

It is another object of the present invention to provide such a microlens used to form in the air the image of an object in the water.

In case of a fiberscope, it is at the end surface of an image fiber that the lens forms an image. Thus, an image fiber having a diameter of about 0.5 mm necessarily requires a lens having a diameter of about 0.5 mm. In addition, the refractive index of the lens has to be considerably large so that a large angle of refraction can be obtained as mentioned above. Under these two conditions, the inventors found such a combination of the axial length of lens and the radii of curvature of its opposite surfaces as to minimize the curvature of field.

The microlens in accordance with the present invention is comprised of a single lens and has a large angle of field and can form an image with a minimum curvature of field. It may be attached to an image fiber for use with an endoscope in the medical field, or may be used as a coupling lens for optical fibers. It can form a clear image without deterioration of the picture quality in the peripheral region of the image.

Since the microlens in accordance with the present invention is comprised of a single lens, it can be easily set and adjusted in the image pickup portion of an endoscope and the like.

With the above-described objects in view and as will become apparent from the following detailed description, the present invention will be more clearly understood in connection with the accompanying drawings, in which.

Figure 1:
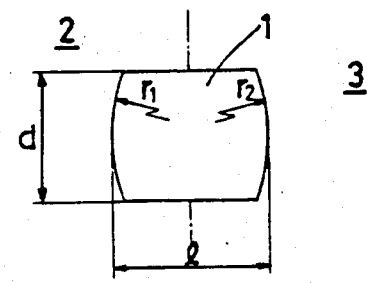
FIG. 1 is a view for explaining the definitions of symbols.

Referring now to FIG. 1, which is a sectional view of a single microlens, the symbols used herein will be defined as follows:

l: Length of the lens d: Diameter of the lens $n_1$: Refractive index of a medium 2 disposed on the left of the lens (i.e., on the side where there is an object to be viewed)

$n_2$: Refractive index of a material of which the lens 1 is made $n_3$: Refractive index of a medium 3 disposed on the right of the lens (i.e., on the side where an image is formed by the lens)

$r_1$: Radius of curvature of the surface of lens facing the medium 2

$r_2$: Radius of curvature of the surface of lens facing the medium 3

Figure 2:
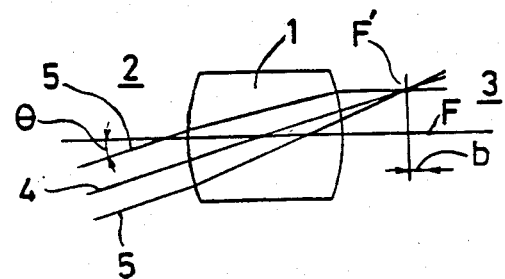
FIG. 2 is a view for explaining the curvature of field.

Referring next to FIG. 2, a principal ray 4 incident upon the lens 1 forms an angle of $\theta$ with the axis of the lens. Two rays 5 run parallel with the principal ray 4 in close vicinity thereto and, after passing through the lens, intersect at a point F' to form an image. The point F' deviates from the focal plane (i.e., a plane which is perpendicular to the axis of the lens and passes through a focus F) by a distance b, which represents the magnitude of curvature of field at an incidence angle of $\theta$.

Figure 3:
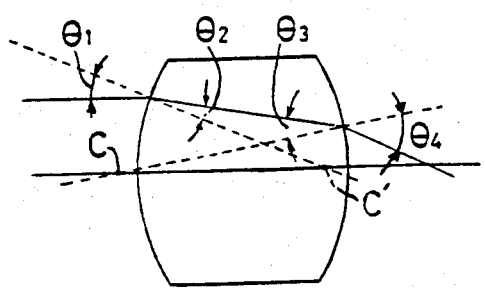
FIG. 3 is a view for explaining the definitions of another set of symbols.

As described above, the single microlens for this purpose has to have a diameter of about 0.5 mm and a large refractive index of about 1.8 to meet the abovesaid requirements. Under such conditions, the inventors sought an optimal combination of $r_1$, $r_2$ and l by repeated calculations using the following Snell's law and by using other methods for designing a lens.

$$\frac{\sin \theta_1}{\sin \theta_2} = \frac{n_2}{n_1}, \frac{\sin \theta_3}{\sin \theta_4} = \frac{n_3}{n_2}$$

Wherein symbols $\theta_1 - \theta_4$ represent the angles shown in FIG. 3, in which C and C' are the centers of curvature of the opposite surfaces.

As a result, for a microlens used to form in the air the image of an object present in the air (thus, $n_1 = 1.0$, $n_3 = 1.0$), such an optimal combination for minimum curvature of field was found to be as follows;

(when $d \leq 0.58$, $1.75 \leq n \leq 1.85$)

$0.58 \leq r_1 \leq 0.60$ (mm)

$0.42 \leq r_2 \leq 0.44$ (mm)

$0.45 \leq l \leq 0.55$ (mm)

When $r_1$, $r_2$ and l are within these ranges, the focal distance f of the lens and the magnitude C of curvature of field when the angle of incidence is 30° were found to fall within the following ranges:

$0.387 \leq f \leq 0.409$ (mm)

$0.057 \leq C \leq 0.064$ (mm)

For a microlens used to form in the air the image of an object in the water (i.e. $n_1 = 1.33$ and $n_3 = 1.00$), of optimal combination of $r_1$, $r_2$ and l for minimum curvature of field was found to be as follows:

$0.29 \leq r_1 \leq 0.31$ (mm)

$0.37 \leq r_2 \leq 0.39$ (mm)
$0.52 \leq l \leq 0.62$ (mm)
($d \leq 0.58$ mm, $1.75 \leq n_2 \leq 1.85$)

When the values of $r_1$, $r_2$ and $l$ are within these ranges, the focal distance f of the lens and the magnitude C of curvature of field when the angle of incidence is 30° were found to fall within the following ranges:
$0.361 \leq f \leq 0.401$ (mm)
$0.083 \leq C \leq 0.110$ (mm)

EXAMPLE 1

A microlens having a diameter of 0.5 mm was made of a material having a refractive index of 1.8. The following values were given as $r_1$, $r_2$ and $l$:
$r_1 = 0.59$ mm, $r_2 = 0.42$ mm, $l = 0.45$ mm When the image of an object in the air was formed in the air, the focal distance f of this microlens was found to be 0.387 mm and the magnitude C of curvature of field was found to be as small as 0.057 mm when the angle of incidence was 30°.

EXAMPLE 2

A microlens having a diameter of 0.5 mm was made of a material having a refractive index of 1.8. The following values were given as $r_1$, $r_2$ and $l$:
$r_1 = 0.30$ mm, $r_2 = 0.38$ mm, $l = 0.52$ mm It was tested for its optical properties with one surface of the lens having a radius of curvature of $r_1$ immersed in the water and the other surface having a radius of curvature of $r_2$ attached to the end of an image fiber. The focal distance f of this microlens was found to be 0.367 mm and the magnitude C of curvature of field was found to be as small as 0.083 mm when the angle of incidence was 30°.

What are claimed are:

1. A microlens for forming in the air the image of an object present in the air, said microlens comprising a single lens having a diameter of not more than 0.58 mm and made of a material having a refractive index of 1.75 to 1.85 both inclusive, said microlens meeting the following conditions:
$0.58 \leq r_1 \leq 0.60$ (mm)
$0.42 \leq r_2 \leq 0.44$ (mm)
$0.45 \leq l \leq 0.55$ (mm)

wherein $r_1$ is the radius of curvature of one of the opposite surfaces of said microlens facing the object, $r_2$ being the radius of curvature of the other of its opposite surfaces on the side where an image is formed, and $l$ being the axial length of said microlens.

2. A microlens for forming in the air the image of an object present in the water, said microlens comprising a single lens having a diameter of not more than 0.58 mm and made of a material having a refractive index of 1.75 to 1.85 both inclusive, said microlens meeting the following conditions:
$0.29 \leq r_1 \leq 0.31$ (mm)
$0.37 \leq r_2 \leq 0.39$ (mm)
$0.52 \leq l \leq 0.62$ (mm)

* * * * *